(12) United States Patent
Joshi et al.

(10) Patent No.: US 11,884,159 B2
(45) Date of Patent: Jan. 30, 2024

(54) ELECTRIC VEHICLE

(71) Applicant: Bajaj Auto Limited, Akurdi (IN)

(72) Inventors: Ashish Mohaniraj Joshi, Akurdi (IN);
Avijit Gupta, Akurdi (IN)

(73) Assignee: Bajaj Auto Limited, Akurdi (IN)

( * ) Notice: Subject to any disclaimer, the term of this patent is extended or adjusted under 35 U.S.C. 154(b) by 232 days.

(21) Appl. No.: 17/413,625

(22) PCT Filed: Dec. 11, 2019

(86) PCT No.: PCT/IN2019/050907
§ 371 (c)(1),
(2) Date: Jun. 14, 2021

(87) PCT Pub. No.: WO2020/121327
PCT Pub. Date: Jun. 18, 2020

(65) Prior Publication Data
US 2022/0041046 A1 Feb. 10, 2022

(30) Foreign Application Priority Data
Dec. 13, 2018 (IN) .............................. 201821047186

(51) Int. Cl.
*B60K 7/00* (2006.01)
*B60K 1/04* (2019.01)
*B60K 17/04* (2006.01)

(52) U.S. Cl.
CPC .............. *B60K 7/0007* (2013.01); *B60K 1/04* (2013.01); *B60K 17/043* (2013.01); *B60K 2001/0405* (2013.01); *B60Y 2200/126* (2013.01)

(58) Field of Classification Search
CPC ........ B60K 7/007; B60K 1/04; B60K 17/043; B60K 2001/0405
USPC ...................................................... 180/65.51
See application file for complete search history.

(56) References Cited

U.S. PATENT DOCUMENTS

| | | | | |
|---|---|---|---|---|
| 6,199,651 B1 * | 3/2001 | Gay | ........................ | B62M 7/12 180/230 |
| 6,217,051 B1 * | 4/2001 | Nakagawa | ............... | B62H 1/04 280/303 |
| 6,679,345 B2 * | 1/2004 | Hirayama | ................ | B62M 7/12 180/220 |
| 7,210,554 B2 * | 5/2007 | Sugiyama | ............ | B62D 5/0484 180/417 |

(Continued)

FOREIGN PATENT DOCUMENTS

| | | |
|---|---|---|
| EP | 2505480 A1 | 10/2012 |
| EP | 2783974 A1 | 10/2014 |
| JP | 2006008131 A | 1/2006 |

*Primary Examiner* — Hau V Phan (57) ABSTRACT

An electric vehicle (10) comprising: a frame (11); an electric battery module (24) comprising at least one battery connected to the frame; an electric motor (20) receiving power from the battery module (24); a transmission system (80) provided with a transmission casing (208B); said electric motor (20) is closely coupled to the transmission system (80) and is mounted on the transmission casing (208B); and a rear wheel (84) receiving power from the electric motor (20) through the transmission system (80) and said rear wheel (84) is connected to the frame using a rear suspension system; wherein the rear wheel (84) is connected to the frame (11) using said casing (208B) forming a part of the rear suspension system.

11 Claims, 11 Drawing Sheets

(56) References Cited

U.S. PATENT DOCUMENTS

| | | | | |
|---|---|---|---|---|
| 7,249,644 B2* | 7/2007 | Honda | ............... | B60L 50/66 |
| | | | | 310/68 B |
| 7,506,708 B2* | 3/2009 | Iwashita | ............ | H01M 16/003 |
| | | | | 180/65.6 |
| 8,453,782 B2* | 6/2013 | Kondo | ............... | B62M 7/12 |
| | | | | 180/291 |
| 8,813,886 B2* | 8/2014 | Nishikawa | ............ | H02K 15/16 |
| | | | | 301/6.5 |
| 8,893,833 B2* | 11/2014 | Tsukamoto | ............ | B62K 25/04 |
| | | | | 180/220 |
| 8,915,325 B2* | 12/2014 | Kikuchi | ............... | B62K 11/10 |
| | | | | 180/219 |
| 9,340,254 B2* | 5/2016 | Bland | ............... | B62M 7/02 |
| 2006/0267436 A1* | 11/2006 | Naito | ............... | H02K 7/12 |
| | | | | 310/191 |
| 2010/0078237 A1* | 4/2010 | Yonehana | ............... | B62M 7/12 |
| | | | | 180/65.51 |
| 2012/0181097 A1 | 7/2012 | Hatanaka et al. | | |
| 2018/0037291 A1* | 2/2018 | Shimizu | ............... | B62M 11/02 |

\* cited by examiner

ELECTRIC VEHICLE

CROSS-REFERENCE TO RELATED APPLICATION

This application is the National Stage of, and therefore claims the benefit of, International Application No. PCT/IN2019/050907 filed on Dec. 11, 2019, entitled "AN ELECTRIC VEHICLE," which was published in English under International Publication Number WO 2020/121327 on Jun. 18, 2020, and has a priority date of Dec. 13, 2018, based on application 201821047186. Both of the above applications are commonly assigned with this National Stage application and are incorporated herein by reference in their entirety.

FIELD OF THE DISCLOSURE

This disclosure relates to electric vehicles and more particularly to packaging of one or more batteries and a transmission system within electric vehicles, particularly 2-wheeler (2W) vehicles.

BACKGROUND

A strong trend to electric vehicle manufacture and use is now becoming evident as concerns with climate change and availability of fossil fuels become evident. Electric vehicles include a number of batteries including a large number of electric cells as a power source and a transmission system as used in conventional vehicles. The number of batteries and transmission system is driven largely by the required vehicle range. At the present time, the transmission system along with readily available batteries remain bulky and this may limit their use particularly where desired vehicle range conflicts with small vehicle size.

For example, small vehicles that currently operate using liquid and gaseous hydrocarbon fuels could advantageously be shifted to electric motor prime movers to reduce emissions. An initial trend to reduced emission prime movers has involved transition from petrol operated engines to gaseous fueled engines, for example of the LPG or CNG type. This has reduced emissions. However, proposed changes in regulations, for example in India, is driving a shift to electrically powered vehicles and there are obvious difficulties in reconfiguring a vehicle fleet to operate with electric motors. Vehicle re-design and re-configuration of manufacturing plants for electric vehicle manufacture is a potentially time consuming and costly exercise. Yet it is desirable to meet directives/focus set by the Government of various countries.

Two wheeled vehicles will also be provided with electric power in coming years. Packaging of the electric battery and transmission is important and the present applicant has disclosed a frame arrangement for this purpose in co-pending Indian Patent Application No. 201 821 0471 88 filed on 13 Dec. 2018, the contents of which are hereby incorporated herein by reference.

Such vehicles must be provided with an electric motor as a prime mover and transmission. The motor is supplied with power from batteries to produce a motive force which is further transferred to driving wheels of the vehicle through transmission system. The electric motor and transmission require considerable space. Packaging the same in given limited space is a challenge as well as a packaging arrangement shall allow efficient transmission of electric power as torque to the driven wheel. At the same time, the transmission must be integrated into the vehicle in a cost-effective way with minimum changes in existing vehicle layout.

Aesthetic of the vehicle is an important aspect while packaging and designing the vehicle. Hence, the packaging of the components needs to be compact and overall aesthetics of the vehicle should not be hampered. This may present some challenge in the case of two wheelers where space for packaging the transmission is substantially constrained.

In electric vehicles, one desired location of the battery is the central lower position of the vehicle. As the battery is a heavier component, the central lower position helps in providing better balance and handling of the vehicle. However; due to the central lower position of the battery, the overall longitudinal length of the vehicle may increase. Therefore, to place the battery at desired location with minimum impact on overall size of the vehicle is challenging.

It is an object of the present disclosure to provide an electric vehicle design with a compact packaging of prime mover and transmission assembly which is cost effective and efficient.

SUMMARY

With this object in view, the present disclosure provides an electric vehicle comprising:
a frame;
an electric battery module comprising at least one battery connected to the frame;
an electric motor receiving power from the battery module;
a transmission system provided with a transmission casing;
the electric motor 20 is closely coupled to the transmission system (80) and is mounted on the transmission casing; and
a rear wheel receiving power from the electric motor through the transmission system and is connected to the frame using a rear suspension system; wherein the rear wheel is connected to the frame using the casing forming a part of the rear suspension system.

The transmission system and the electric motor are closely coupled and mounted within the dimensions of rear wheel. This helps in compact packaging thereby maintaining appropriate vehicle length as well as provides good aesthetics. The transmission system may form a structural element of a suspension system and, in this case, a number of options are available. According to first embodiment, where the vehicle is a 2 wheeler vehicle such as a scooter, a swing arm is typically included as a key component of the rear suspension system as it connects the rear wheel pivotably with the frame of the vehicle. The swing arm locates the rear axle while pivoting vertically, to allow the rear suspension systems to absorb shocks from bumps in the road. Motor may be mounted on the transmission casing. In such case, the transmission casing (which also acts as a motor shaft casing) may act as the swing arm. One end of the transmission casing may conveniently be mounted to the frame at a first pivot joint forward of the rear wheel while the other end is mounted to a rear suspension member, such as a rear shock absorber, at a second pivot joint while the transmission system is also driveably connected to the rear wheel. Preferably, the second pivot joint is provided on the casing itself which helps in securely mounting one end of the shock absorber which is located on the same side of the vehicle due to the load imposed by the electric motor and transmission systems. This option avoids any requirement for providing separate and specialised suspension mounting arrangements thereby helping to reduce complexity and cost. This option may also remove the need for a separate swing arm, therefore saving cost. It also helps in compact arrangement and better aesthetics. As the separate swing arm is not provided, weight of the vehicle is also reduced which is one of the important aspects while designing electric vehicle.

According to second embodiment, and in an option that may include the first, the transmission casing may not act as a support member for the rear suspension system. The mounting point of shock absorber is provided separately and not on the transmission casing which may be on either side of vehicle.

The vehicle may be conveniently provided with a mono-suspension with only one rear shock absorber used to provide necessary suspension for the vehicle. Managing the suspension with only one rear shock absorber helps in reducing the overall Cost.

The transmission system may be a single speed, multi stage transmission. The number of reduction stages in the transmission system may vary based on vehicle requirements. Preferably, a fixed ratio double stage, single speed transmission is used. The transmission system is closely coupled with electric motor such that an output shaft of motor is proximate to the input shaft of transmission unit and connected to transfer the torque generated by the motor. The number of reduction stages corresponds to a number of gear pairs. An output shaft of the motor is connected to the input shaft of transmission through a first gear pair. The input shaft of the transmission is connected to an output shaft through a second gear pair. Output torque received from the transmission system is then transmitted to the rear wheel of the vehicle as the output shaft of transmission assembly is directly connected to the axle of the rear wheel. Alternatively, a suitable drive, such as a belt drive, may be used to transmit the power from motor to wheel. If a separate swing arm is provided, which should not be necessary for reasons given above, the motor and transmission assembly should be mounted on the vehicle swing arm.

The input shaft is supported at both ends by bearings, which in turn are supported in transmission housing. The primary input gear is rotatably mounted on the motor output shaft (integral in this case). The motor output shaft is connected to input gear coaxially, the arrangement is made such that the motor shaft and input gear connection lies within the input gear length supported by the aforementioned bearings. This helps with reducing the mesh-misalignment of the primary gear pair, which further helps in considerable reduction in the gearbox whine noise. This arrangement is particularly preferable as the primary gear pair is highly susceptible to unacceptable levels of gear whine noise due to high RPMs.

According to one of the embodiments, the motor and transmission housing are separate. The motor output shaft coming out of motor housing is connected to the transmission housing such that the motor output shaft is supported at four locations, two locations are within motor housing and other two locations are in transmission housing. However; according to another embodiment, the motor & transmission housing are integrated into a single housing wherein; the motor output shaft may be supported only at three locations using bearings. Two locations being ends of the shaft and third location is at a common point where two housings are integrated.

The motor output shaft is provided with an input gear as an integral part of the motor output shaft. The input gear is meshed with the teeth provided on the outer periphery of the motor output shaft. Due to the backlash provided between the input gear and the teeth of motor output shaft a noise is produced especially due to sudden acceleration or deceleration at low speed level. In order to obviate this noise a silent bush is introduced. The input gear is fitted and fixed on the motor output shaft with a help of a bolt meshed with the internal threads provided on the inner part of the motor output shaft. The bush is mounted in gap created between bolt and inner surface of input gear. The bush helps in absorbing the noise thereby eliminating the problem of noise.

This layout also helps with reducing the overall width of the gearbox as most/all of the protruding motor output shaft length is accommodated in the input gear length. The exceptionally low misalignment values also help in reducing the gearbox size as other solutions for reducing whine noise might not be needed here.

Further, this transmission arrangement eliminates the need of a flexible drive transmitting element (such as chain or belt drive) to accommodate the rear wheel travel. This results in improved driveline efficiency, better NVH characteristics and reduced overall servicing/adjustment requirements. Though, the flexible drive may be used if required.

The motor and transmission can be placed on either side of the vehicle. The selected side will depend on constraints such as location of passenger footrest, side stand etc. A cover is desirably mounted over the transmission casing to direct air flow towards the motor. Such cover is typically designed to improve vehicle aesthetics.

The electric battery module is a relatively heavy vehicle component. For a two wheeled vehicle, a substantially equal weight distribution along the length of the vehicle is highly desirable to enable a driver to balance weight distribution in order to balance the vehicle during driving. An uneven weight distribution within the vehicle, though possible, makes it difficult for a driver to maintain vehicle balance which can ultimately lead to unsafe conditions. Ideally, the battery or battery module is located centrally along the width of the vehicle, preferably at a central location along the length of the vehicle. The position of the battery plays an important role in defining the centre of gravity (CG) of the vehicle. Desirably, the battery is positioned on a central lower side of vehicle, shifting the CG of vehicle to substantially the same location. Such CG location helps in improving driving stability, handling and overall efficiency of the vehicle.

With the use of transmission casing as a swing arm the battery position can be lowered. Motor and transmission system are closely coupled on the transmission casing. This helps in a compact arrangement of batteries without increasing overall length of the vehicle.

The vehicle, as described above, is conveniently a two-wheeler vehicle such as a motorcycle or scooter.

BRIEF DESCRIPTION OF DRAWINGS

The electric vehicle of the present disclosure may be more fully understood from the following description of preferred embodiments thereof, made with reference to the accompanying drawings in which:

FIG. 7(*a*) is a schematic partial rear left hand side view showing the motor-transmission position for the electric vehicle of FIG. 1.

FIG. 7(*b*) is a schematic partial rear right hand side view showing the suspension system for the electric vehicle of FIG. 1.

FIG. 7(*c*) is a schematic partial left hand side isometric view showing the suspension system for the electric vehicle of FIG. 1.

FIG. 7(*d*) shows a detail from FIG. 7(*c*) showing the motor transmission assembly which also forms part of the suspension system of the electric vehicle of FIG. 1.

DETAILED DESCRIPTION

Figure 1:
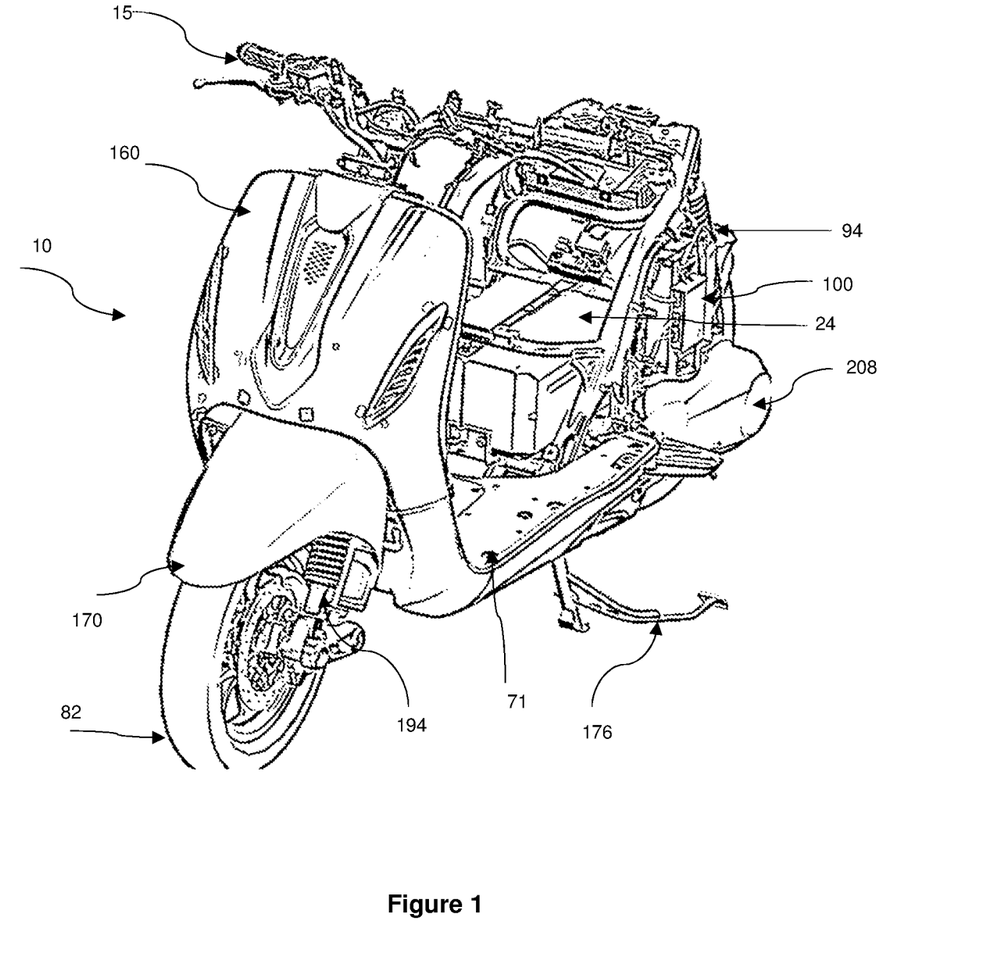
FIG. 1 is a partial isometric view of an electric vehicle according to a first embodiment of the present disclosure.
Figure 2:
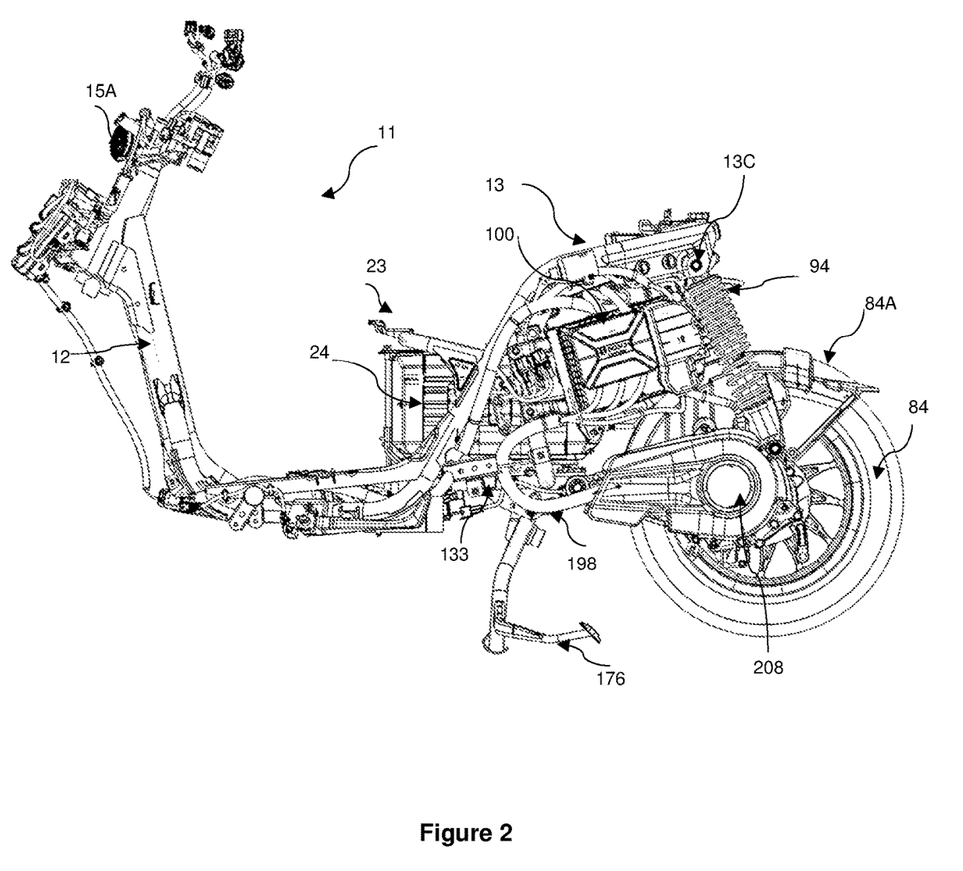
FIG. 2 is a partial side view of the electric vehicle of FIG. 1.
Figure 3:
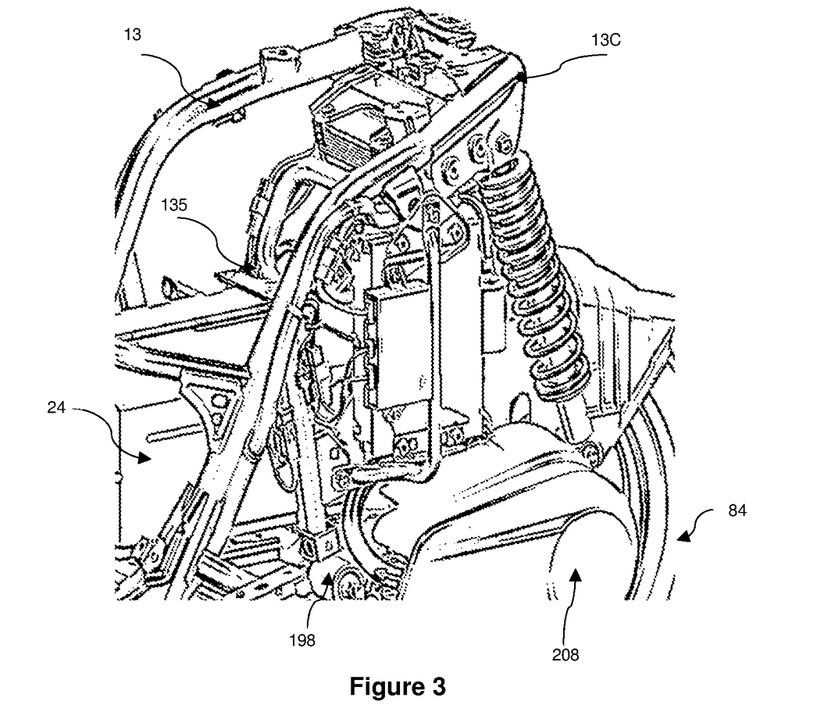
FIG. 3 is a first detail side view projected from FIG. 3 showing vehicle control unit, motor transmission assembly and shock absorber in relation to the rear frame portion of the electric vehicle of FIG. 1.
Figure 4:
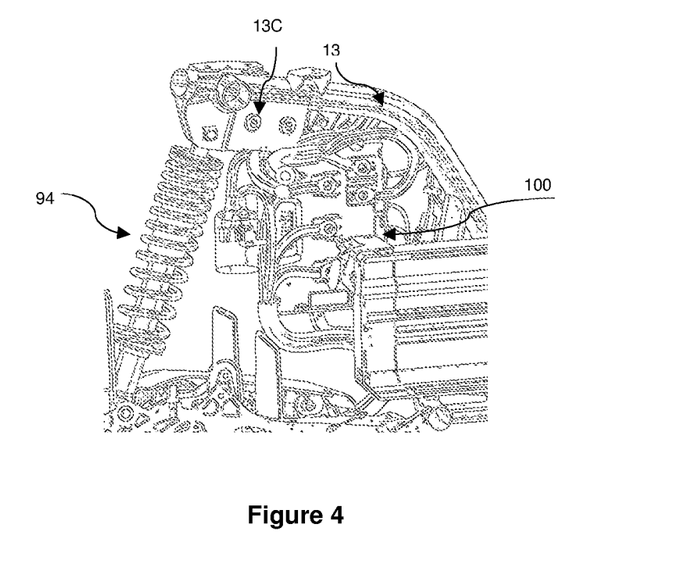
FIG. 4 is a second detail side view projected from FIG. 3 showing the battery, vehicle control unit and shock absorber.
Figure 5:
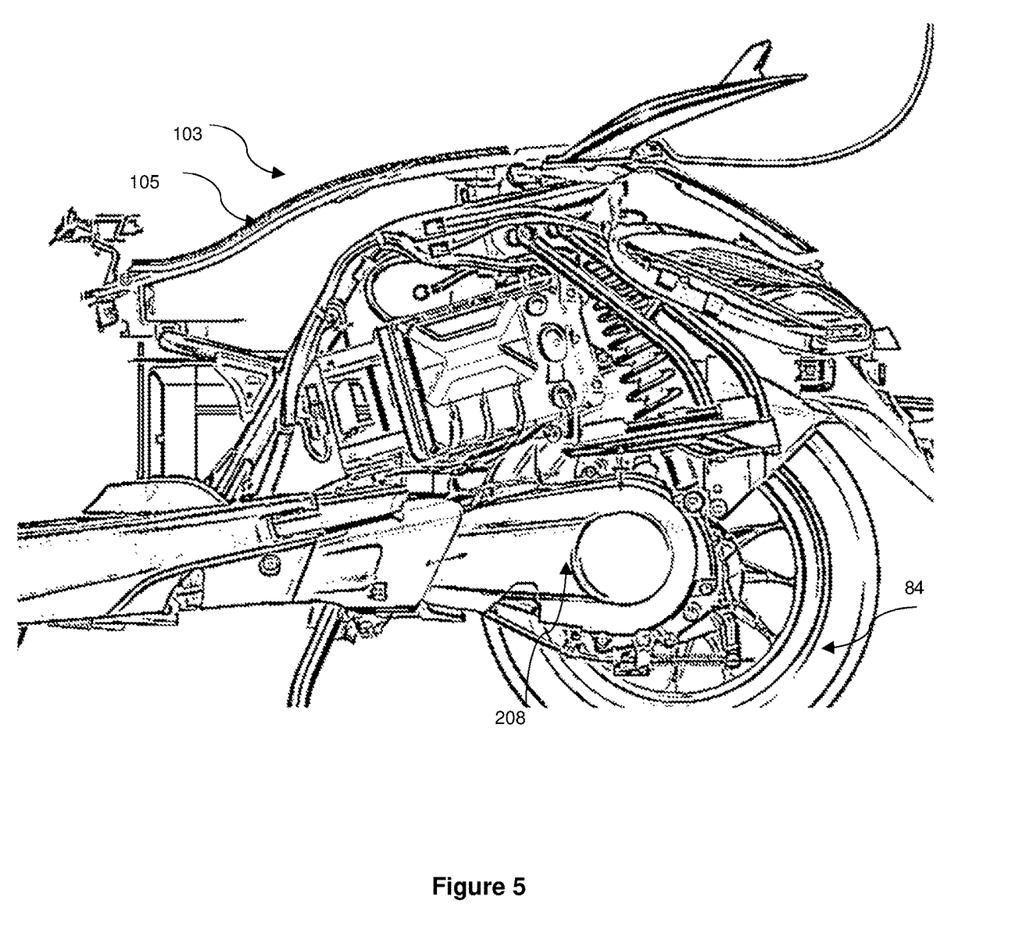
FIG. 5 is a schematic side section view of the rear portion of the electric vehicle of FIG. 1.
Figure 6:
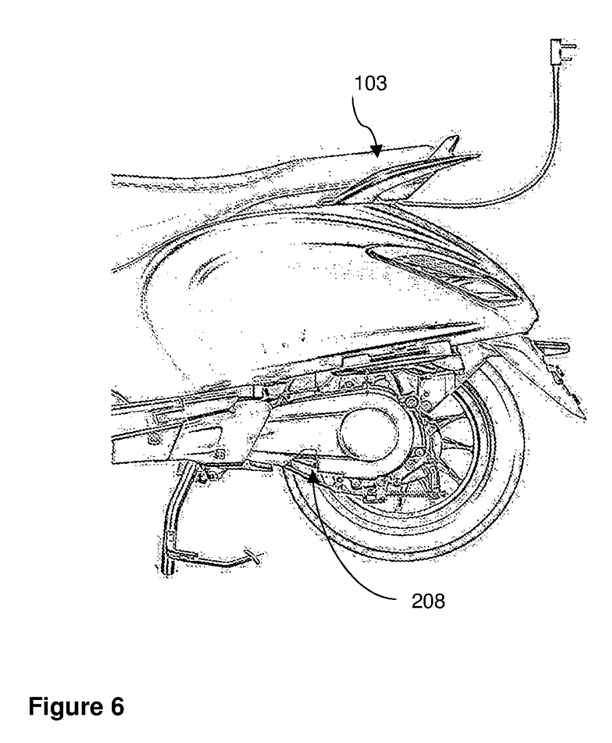
FIG. 6 is a partial side view of the rear portion of the electric vehicle of FIG. 1.

Referring now to FIGS. 1 and 2, there is shown an electric vehicle 10 suitable for use as a commuter vehicle and having a frame 11 having a head tube 12, a front portion 14 and a rear frame portion 13. The electric vehicle 10 is a two-wheeler scooter including a front wheel 82 and rear wheel 84. Rear wheel 84 is provided with a rear mudguard 84A and a swing arm suspension system described further below with a single shock absorber 94. Scooter 10 is shown mounted on a stand 176 of conventional form.

The driver, who may sit on seat 103, steers electric vehicle 10 through handlebar 15 which includes brakes and horn 15A. The driver is protected by front panel or guard 160 and front mudguard 170 and may comfortably place feet on floorboard 71.

Electric vehicle 10 has an electric motor 20 and transmission system 80 are closely coupled and forming an integrated motor-transmission assembly 208, powered by an electric battery module 24 comprising a single battery as shown in FIGS. 1 to 4. Electric battery module 24 is positioned to the rear of the vehicle 10 above the electric motor 20 and transmission system 80, a position which provides a convenient position for routing the wire harness.

Electric motor 20 has a rating of 4 kW to 10 kW (though this rating is dictated by application) and is controlled by vehicle control unit (VCU) 100. Electric battery module 24 including at least one battery 24 each with 48-volt rating provides electric power to motor 20. Electric battery module 24 is located below the seat 103 and the luggage compartment 105, of the scooter 10 which demonstrates compactness as space remains available even with a change from an internal combustion engine prime mover to an electric motor prime mover. Electric battery module 24 includes a protective frame structure 23.

Battery module 24 requires to be securely connected to the rear frame portion 13 and a number of locking means, in the form of nut and bolt fasteners, are used for this purpose.

Scooter 10 includes a frame 11 as mentioned above and this frame structure, which supports the electric battery module 24 and the motor-transmission assembly 208 along with further vehicle components. Frame 11 is described in the Applicant's co-pending Indian Patent Application, filed under application number 201 821 0471 88 dated 13 Dec. 2018 and is therefore no further described here. It may be noted, however, that the electric battery module 24 is a relatively heavy vehicle component. For scooter 10, a substantially equal weight distribution along the length of the scooter 10 is highly desirable to enable a driver to balance weight distribution in order to balance the scooter 10 during driving. To that end, the electric battery module 24 is located centrally along the width of the scooter 10, at a central lower location along the length of the scooter 10 below rear portion of the frame 13. This central lower position of the battery module 24 relative to scooter 10 effectively defines the centre of gravity (CG) of the scooter 10. Such CG location helps in improving driving stability, handling and overall efficiency of the scooter 10.

Referring to FIGS. 3 to 7(*d*), scooter 10 is provided with a rear mono-suspension i.e. only one shock absorber 94 on the motor-transmission system 20/80 side of scooter 10 as most load is on this side. Shock absorber 94 is desirably of the SNS type as described in Indian Patent No. 695/MUM/2005, is used to provide rear suspension to reduce cost. Shock absorber 94 is located at the rear of scooter 10 rather than at its centre.

The motor 20 and transmission 80 are closely coupled and mounted within dimensions of the rear wheel 84 as specifically shown in FIG. 7(*a*). This helps in a compact packaging without hampering the overall length of the vehicle and also provides good aesthetic. The motor-transmission casing 208B forms a structural element of the rear suspension system. Motor-transmission casing 208B acts as a swing arm since it is pivotally mounted both to a mounting bracket portion 133, connecting with a tube 13 of frame 11, at pivot joint 198 forward of the rear wheel 84 and to shock absorber 94 at a pivot joint 209. The shock absorber has a fixed mounting to mounting bracket 194 connected to a rear tube 13C of the rear frame portion 13. Such mounting allows the motor-transmission assembly 208 to vertically pivot in the manner of a swing arm. As scooter 10 moves along a road, the shock absorber 94 spring element is variably placed into tension and compression, the motor-transmission casing 208B correspondingly pivoting as a swing arm absorbing shocks from bumps in the road. Also, the transmission casing 208B absorbs the shocks & braking torque and hence there is no need to provide any separate member to take counter breaking torque. The cost and weight of a dedicated swing arm is thereby avoided.

Figure 7A:
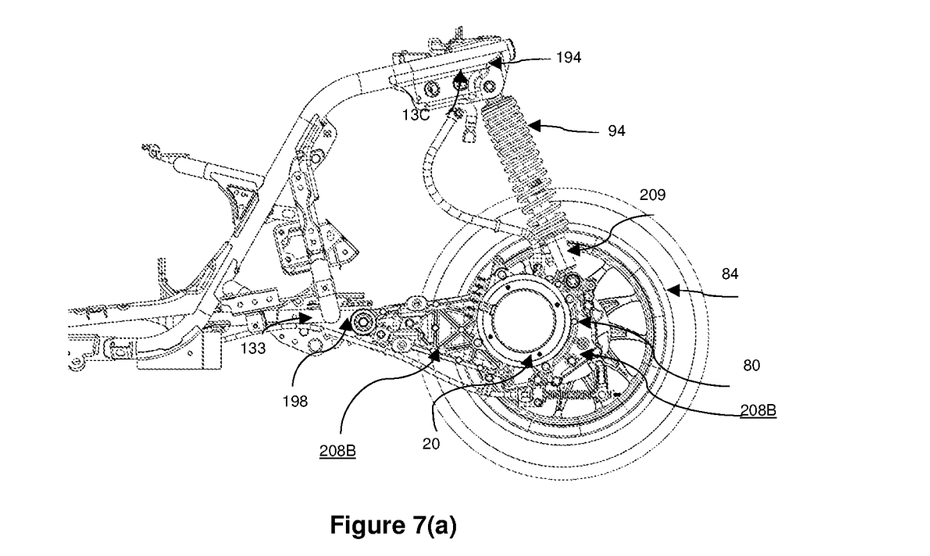
Figure 7B:
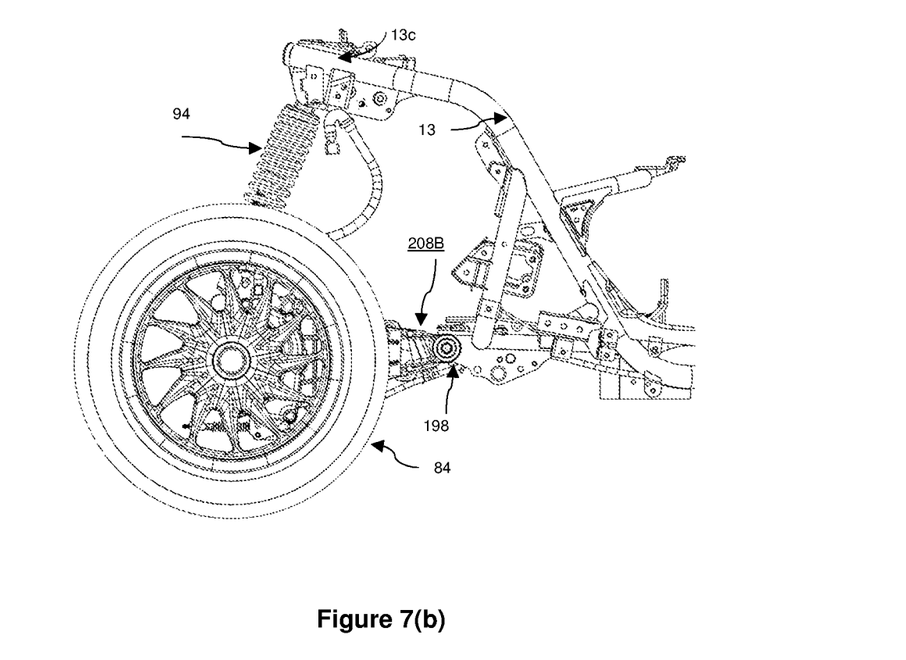
Figure 7C:
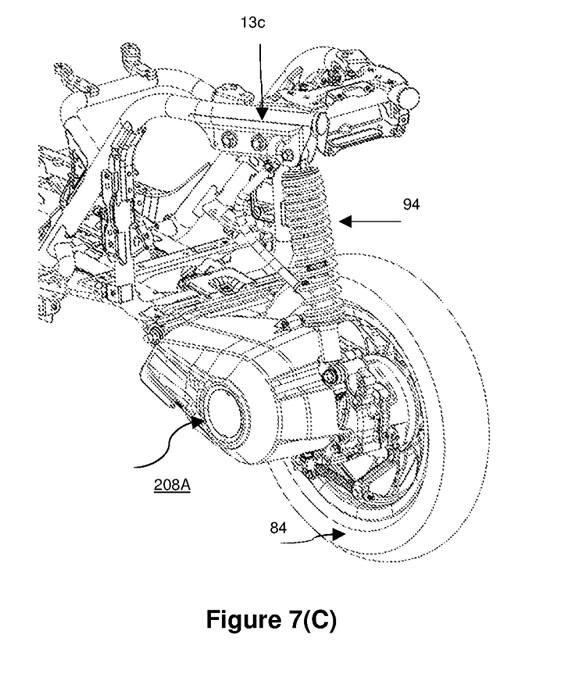

The mounting arrangements described above also allow the transmission casing 2083 to act as a support member for the rear suspension system. The further pivot joint 209 is provided on the casing 208B itself which helps in securely mounting one end of the shock absorber 94. This option avoids any requirement for providing separate and specialised suspension mounting arrangements thereby helping to reduce complexity and cost.

Figure 9:
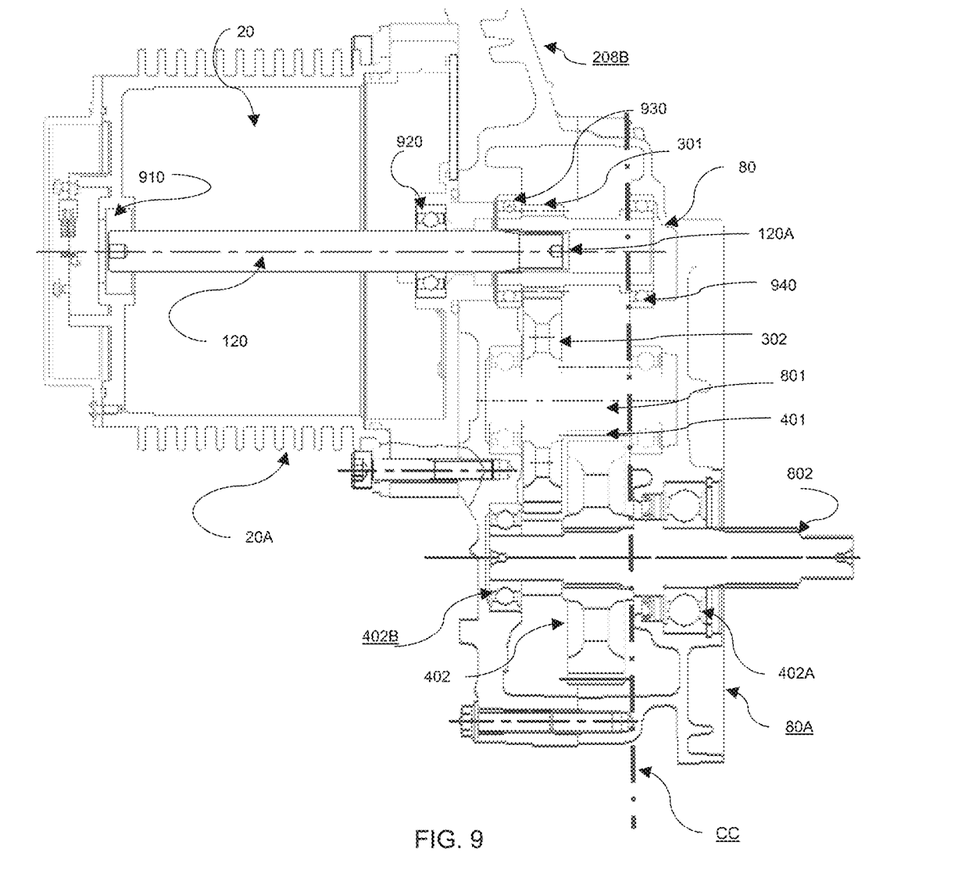
FIG. 9 is a schematic layout of the transmission system included within the motor-transmission assembly of FIG. 8.

Further features of the transmission system 80 which transmits torque from electric motor 20 under the supervision of vehicle control unit 100 are now described with reference to FIG. 9. The transmission system 80 is a single speed or single reduction type transmission. The number of reduction stages in the transmission system 80 may vary based on vehicle requirements. A fixed ratio double stage transmission system 80 with a single pair of input and output gears is used. The motor 20 is closely coupled with the transmission system such that an output shaft 120 of motor 20 is proximate to the input shaft of transmission system 80 and connected to transfer the torque generated by the motor 20. The number of reduction stages corresponds to a number of gear pairs. The output shaft 120 of the motor 20 is connected to the input shaft 801 of transmission system through a first gear pair 301, 302. According to one of the embodiments, the output shaft 120 of the motor including input gear 301 is supported at four locations i.e. at both the ends (910 & 940) one end being in motor housing 20A while other end is supported at transmission housing 80A. The output shaft 120 is also supported at middle section using bearings (930,940) provided at motor housing 20A and transmission housing 80A. The input shaft is supported at both ends by bearings, which in turn is supported in transmission housing 80A. The primary input gear 302 is rotatably mounted on the input shaft 801 (integral in this case). The motor output shaft 120 is connected to input gear 301 coaxially by means of internal splines 120A, the arrangement is made such that the motor shaft 120 and input gear 301 connection lies within the input gear length supported by the aforementioned bearings. The input shaft 801 of the transmission system is connected to the output shaft 802 of transmission system 80 through a second gear pair 401, 402. The output shaft 802 is supported at two locations through bearings (402A, 402B). The vehicle centreline (CC) as shown in FIG. 9, passes between bearings at two locations (420A, 402B). The above described transmission & bearing arrangement helps in avoiding uneven forces (even distribution of load) acting on bearing, thereby maximizing bearing life and no extra bearings are needed to support the shaft. Output torque received from the transmission system 80 is then transmitted to the rear wheel 84 of the scooter as the output shaft 802 of transmission system 80 is directly connected to the axle of the rear wheel 84. A suitable drive, such as a belt drive, may be used to transmit the power from motor to wheel.

Figure 10:
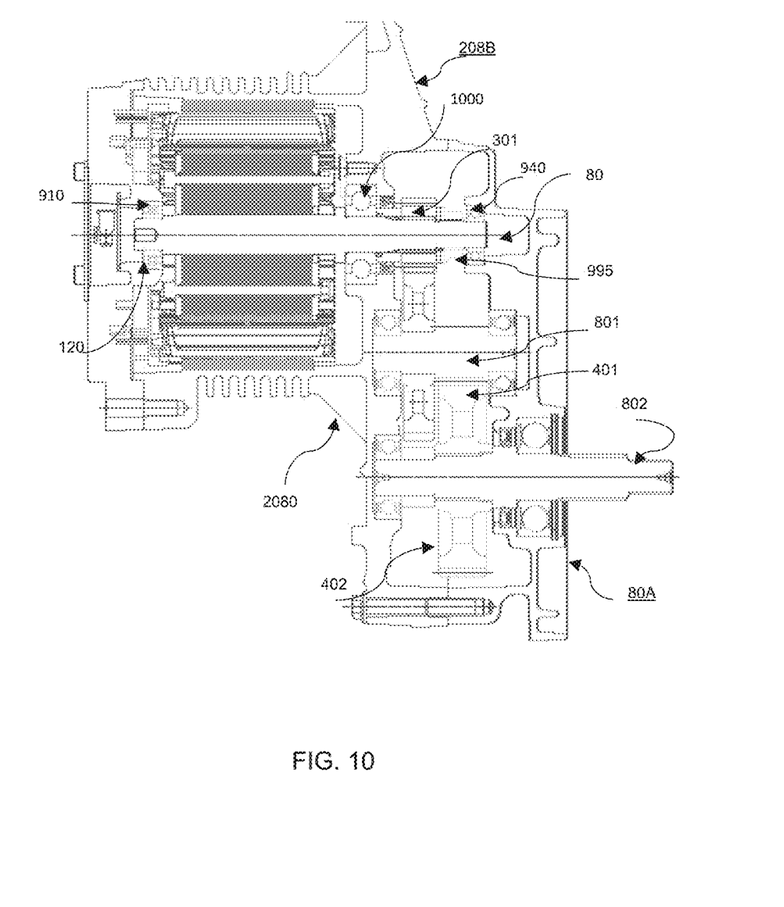
FIG. 10 is a schematic view of layout of transmission system provided with integral housing according to one of the embodiments of present disclosure.

According to another embodiment of present disclosure, the transmission system is further improved as shown in FIG. 10. Instead of separately providing motor housing 20A and transmission housing 80A, both the housings are integrated into a single housing 2080. This eliminates the various problems such as noise, difficulty in assembling two different housings with mounting of motor output shaft 120 etc. The motor output shaft 120 is supported at three locations (910, 940 & 1000) instead of four locations, this helps in reducing noise as well as helps in easy assembly. The shaft 120 is supported only at a common single location (1000) in middle location whether both the housings (20A & 80A) are integrated. Both the ends of the motor output shaft 120 are supported at housing 2080 using bearings (910 & 940) as in previous embodiment. In order to restrict any uneven load from acting on bearings (910, 940, 1000) the input gear 301 is clamped with the help of a nut 995. One bearing pair is therefore eliminated thereby reducing complexity & cost.

Figure 11A:
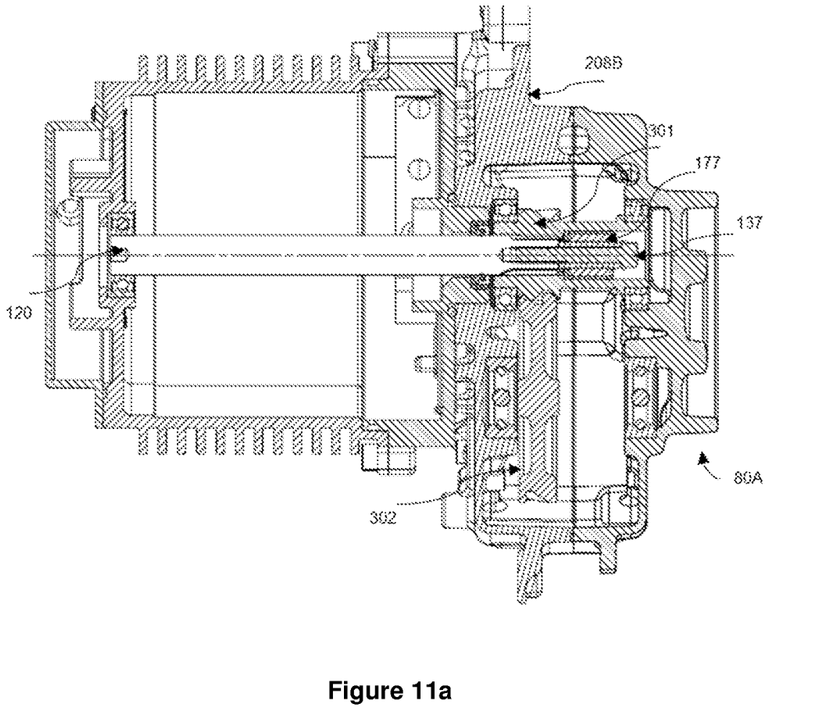
FIG. 11*a* represents a schematic view of the transmission system with silent bush according to one of the embodiments of present disclosure.
Figure 11B:
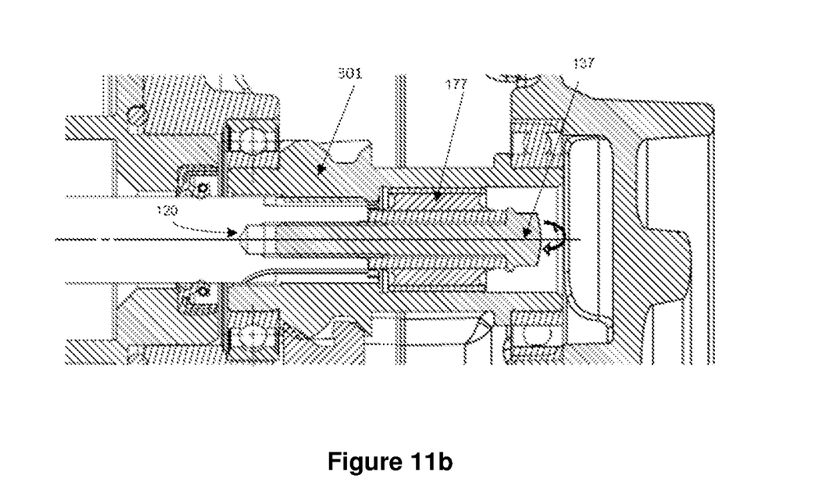
FIG. 11*b* represents a detailed schematic view of the transmission system of FIG. 11*a*

The motor output shaft 120 is provided with an input gear 301 as an integral part of the motor output shaft 120. The motor output shaft 120 is provided with teeth on its outer periphery to mesh with an input gear 301 of first gear pair. Due to the backlash provided between the internal teeth of input gear 301 and the teeth of motor output shaft 120 a noise is produced especially due to sudden acceleration or deceleration at low speed level. In order to obviate this noise a silent bush 177 is introduced as illustrated in FIGS. 11a and 11b. The input gear 301 is fitted and fixed on the motor output shaft 120 with a help of a bolt 137 meshed with the internal threads provided on the inner part of the motor output shaft 120. The bush 177 is mounted in gap created between bolt 137 and inner surface of input gear 301. The bush 177 helps in eliminating the problem by absorbing the noise.

Figure 7D:
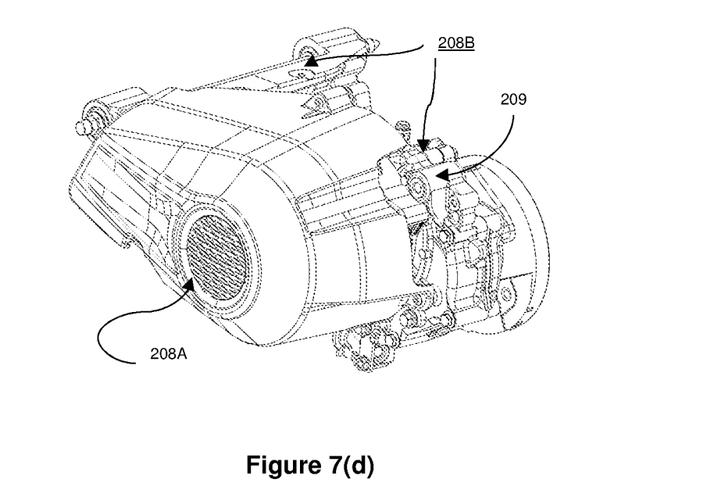
Figure 8:
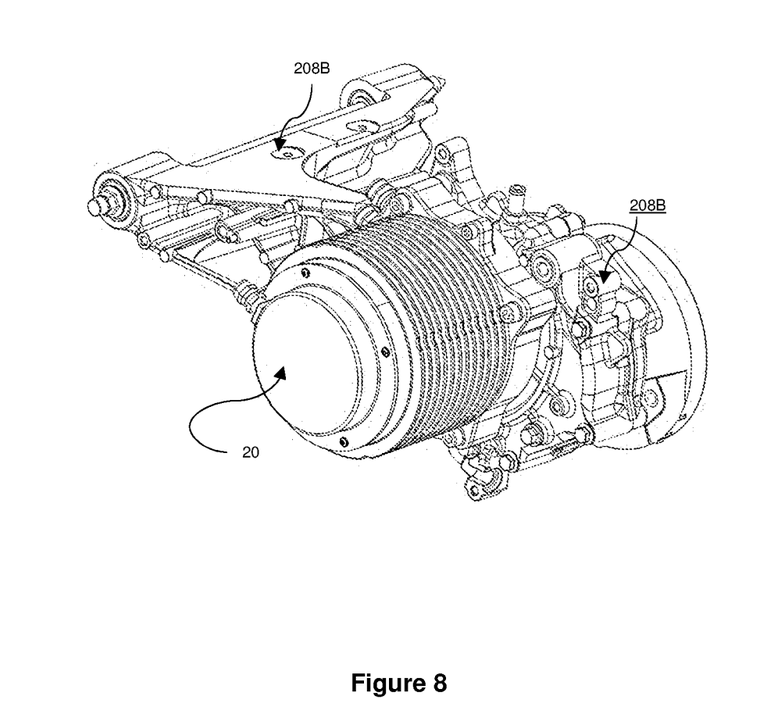
FIG. 8 is an isometric view showing the motor-transmission assembly for the electric vehicle of FIG. 1.

A cover 208A is desirably mounted over the transmission casing 208B to direct air flow towards the motor 20. Such cover 208A, shown schematically in FIG. 7d is typically designed to improve vehicle aesthetics.

Modifications and variations to the electric vehicle described in the present specification may be apparent to skilled readers of this disclosure. Such modifications and variations are deemed within the scope of the present disclosure.

We claim:

1. An electric vehicle comprising:
   a frame;
   an electric battery module including at least one battery connected to the frame;
   an electric motor receiving power from the electric battery module;
   a transmission system closely coupled to the electric motor; and
   a rear wheel receiving power from the electric motor through the transmission system, wherein the electric motor and the transmission system are located on a same side of the rear wheel, and further wherein the rear wheel is connected to the frame using a swing arm, the swing arm:
   functioning as a transmission casing by encompassing the transmission system and forming an integral part of the transmission system;
   having a provision for externally mounting the electric motor towards an opposite side of transmission system;
   extending horizontally such that one end of the swing arm mounts on the rear wheel and the other end is pivotally mounted on the frame forward of a rear wheel to form a structural element of a suspension system of the vehicle; and
   wherein the transmission system is a single speed, multi stage transmission, comprising an input shaft connected to an output shaft of the electric motor through a first gear pair, and the input shaft of the transmission is further connected to an output shaft of the transmission system through a second gear pair, and further wherein the output shaft of the transmission system is connected to the rear wheel of the vehicle for transmitting the torque.

2. An electric vehicle as claimed in claim 1, wherein the transmission system and the electric motor are closely coupled such that the transmission system and the electric motor are mounted within dimensions of rear wheel.

3. An electric vehicle as claimed in claim 1, wherein the swing arm is connected to the frame at a first pivot joint forward of the rear wheel and to the second pivot joint at a rear axle of the rear wheel such that the swing arm pivots vertically, to allow the rear suspension system to absorb shocks from bumps in the road.

4. An electric vehicle as claimed in claim 1, wherein the suspension system includes at least one shock absorber mounted at the transmission casing.

5. An electric vehicle as claimed in claim 1, wherein the transmission system uses a chain or belt drive to transmit the power from the electric motor to the rear wheel.

6. An electric vehicle as claimed in claim 1, wherein the transmission system includes an input gear supported at both ends by bearings in a transmission housing and the input gear of the first gear pair is coaxially mounted on the electric motor output shaft such that the electric motor output shaft and the transmission input gear connection lies within the transmission input gear length.

7. An electric vehicle as claimed in claim 1, wherein the transmission system is provided in a transmission housing and the electric motor is provided in a motor housing, wherein both the transmission housing and the motor housing are separate and connected to each other such that an electric motor output shaft including an input gear is supported at four or more locations through bearings, and further wherein two locations are present in the motor housing and two other locations are present in the transmission housing.

8. An electric vehicle as claimed in claim 1, wherein the transmission system and the electric motor are provided in a common integral housing such that an electric motor output shaft including an input gear is supported through bearings at three or more locations, and further wherein two locations are ends of the electric motor output shaft and a third location is at an intermittent location of the electric motor output shaft.

9. An electric vehicle as claimed in claim 1, wherein the first gear pair includes an input gear mounted on an electric motor output shaft using a bolt, and further wherein the bolt is meshed with internal threads provided on an inner part of the electric motor output shaft and a bush is mounted in a gap created between the bolt and an inner surface of input gear.

10. An electric vehicle as claimed in claim 1, wherein the transmission casing is provided with a cover to direct airflow towards the electric motor.

11. An electric vehicle as claimed in claim 1, wherein the electric battery module is mounted centrally and below a rear frame portion.

* * * * *